(12) United States Patent
Kim et al.

(10) Patent No.: US 9,755,736 B2
(45) Date of Patent: Sep. 5, 2017

(54) SMART REMOTE NODE OPTICAL NETWORK UNIT AND OPERATION METHOD THEREOF

(71) Applicant: ELECTRONICS AND TELECOMMUNICATIONS RESEARCH INSTITUTE, Daejeon (KR)

(72) Inventors: Jae In Kim, Gwangju (KR); Sung Chang Kim, Gwangju (KR); Geun Yong Kim, Gwangju (KR); Dongsoo Lee, Seongnam-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/070,778

(22) Filed: Mar. 15, 2016

(65) Prior Publication Data
US 2016/0277102 A1 Sep. 22, 2016

(30) Foreign Application Priority Data

Mar. 17, 2015 (KR) ........................ 10-2015-0036857

(51) Int. Cl.
| | | |
|---|---|---|
| H04B 10/073 | (2013.01) | |
| H04J 14/02 | (2006.01) | |
| H04B 10/077 | (2013.01) | |
| H04B 10/071 | (2013.01) | |

(52) U.S. Cl.
CPC ....... *H04B 10/0775* (2013.01); *H04B 10/071* (2013.01)

(58) Field of Classification Search
USPC .................................................. 398/16, 9, 1
See application file for complete search history.

(56) References Cited

U.S. PATENT DOCUMENTS

| | | | |
|---|---|---|---|
| 6,614,759 B1 | 9/2003 | Lee et al. | |
| 6,636,527 B1 | 10/2003 | Lee et al. | |
| 7,757,936 B2 * | 7/2010 | Aguren | ................ G02B 6/3895 235/375 |
| 8,472,804 B2 | 6/2013 | Trojer | |

(Continued)

FOREIGN PATENT DOCUMENTS

| | | |
|---|---|---|
| KR | 10-2009-0100109 A | 9/2009 |
| KR | 10-2010-0040206 A | 4/2010 |

(Continued)

*Primary Examiner* — Oommen Jacob
(74) *Attorney, Agent, or Firm* — Rabin & Berdo, P.C.

(57) ABSTRACT

Disclosed is a smart remote node optical network node including an optical layer monitoring unit configured to transmit a monitoring light signal to an optical network unit through an optical switch and receive a monitoring light signal reflected from the optical network unit, an infra recognition unit configured to recognize whether an optical connector is connected to an output port of a remote node and an identification number of the optical connector when the optical connector is connected thereto, and a control unit connected to the optical layer monitoring unit and the infra recognition unit and configured to control recognition and monitoring operations of the remote node according to a remote node application.

9 Claims, 4 Drawing Sheets

(56) References Cited

U.S. PATENT DOCUMENTS

| | | | | |
|---|---|---|---|---|
| 2004/0196664 A1* | 10/2004 | Renard | ............ | G01M 11/3136 362/551 |
| 2010/0322620 A1* | 12/2010 | Wellbrock | ......... | H04Q 11/0003 398/18 |
| 2011/0173315 A1* | 7/2011 | Aguren | ................. | H04L 63/20 709/224 |
| 2011/0255860 A1* | 10/2011 | Lee | ................. | G01M 11/3136 398/12 |
| 2012/0039598 A1* | 2/2012 | Dahlfort | ............ | H04B 10/071 398/13 |
| 2013/0259469 A1* | 10/2013 | Smith | ............... | H04J 14/0227 398/16 |
| 2014/0003806 A1* | 1/2014 | Urban | ............... | G01M 11/3127 398/21 |
| 2014/0016901 A1* | 1/2014 | Lambourn | ........... | G02B 6/3895 385/75 |
| 2014/0077971 A1* | 3/2014 | Archambault | ........... | H04Q 9/00 340/870.04 |
| 2015/0139637 A1* | 5/2015 | Vall-Llosera | ........ | H04B 10/071 398/14 |
| 2015/0229389 A1* | 8/2015 | Kim | ................. | H04B 10/073 398/17 |
| 2016/0277102 A1* | 9/2016 | Kim | ................. | H04B 10/071 |

FOREIGN PATENT DOCUMENTS

| | | |
|---|---|---|
| KR | 10-2012-0030397 A | 3/2012 |
| WO | WO-2010/126427 A1 | 11/2010 |

* cited by examiner

SMART REMOTE NODE OPTICAL NETWORK UNIT AND OPERATION METHOD THEREOF

CROSS-REFERENCE TO RELATED APPLICATIONS

This U.S. non-provisional patent application claims priority under 35 U.S.C. §119 of Korean Patent Application No. 10-2015-0036857, filed on Mar. 17, 2015, the entire contents of which are hereby incorporated by reference.

BACKGROUND

The present disclosure herein relates to an optical communication field, and more particularly, to a smart remote node optical network unit and an operation method thereof.

Typically, passive optical network (PON) technology is known as technology for providing a high speed network service to a subscriber by using an optical fiber. The PON enables relatively expensive optical communication technology to be constructed and operated at low cost. Accordingly, the existing copper line based technology such as xDSL and HFC, etc., is rapidly replaced with the PON.

For the PON, at the time of occurrence of faults in an optical network layer, it is necessary to monitor a physical layer in real time and also necessary to effectively obtain and manage information on resources coupled to nodes.

SUMMARY

An embodiment of the inventive concept provides a smart remote node optical network node including: an optical layer monitoring unit configured to transmit a monitoring light signal to an optical network unit through an optical switch and receive a monitoring light signal reflected from the optical network unit; an infra recognition unit configured to recognize whether an optical connector is connected to an output port of a remote node and an identification number of the optical connector when the optical connector is connected thereto; and a control unit connected to the optical layer monitoring unit and the infra recognition unit and configured to control recognition and monitoring operations of the remote node according to a remote node application.

In an embodiment, the smart remote node optical network node may further include an environment sensor unit configured to detect surrounding environment information of the smart remote node optical network node to provide the surrounding environment information to the control unit, the smart remote node optical network node may further include a communication module configured to provide data generated in the recognition and monitoring operation of the remote node to an optical distribution network integrated management server through a communication line.

In an embodiment of the inventive concept, an operation method in smart remote node optical network node, includes: installing, in a smart remote node optical network node, an optical layer monitoring unit configured to transmit a monitoring light signal to an optical network unit through an optical switch and receive a monitoring light signal reflected from the optical network unit; installing an infra recognition unit configured to recognize whether an optical connector is connected to an output port of a remote node and an identification number of the optical connector when the optical connector is connected thereto; receiving the optical connector identification number from the infra recognition unit; and analyzing a monitoring light signal reflected from the optical layer monitoring unit to perform monitoring on an optical communication link of the remote node.

In an embodiment of the inventive concept, a smart remote node optical network node includes: an optical layer monitoring unit configured to transmit a monitoring light signal to an indoor optical network terminal and receive a monitoring signal reflected by the indoor optical network terminal through an optical switch; an infra recognition unit configured to recognize, through an optical cable, whether an optical connector, which is connected to the indoor optical network terminal, is connected to an output port of the remote node and an identification number of the optical connector when the optical connector is connected thereto; and a main processor connected to the optical layer monitoring unit and the infra recognition unit and configured to control recognition and monitoring operations of the remote node according to a remote node application.

In an embodiment of the inventive concept, a remote node operation method in a smart remote node optical network node, includes: installing an infra recognition unit and an optical layer monitoring unit in a smart remote node; recognizing whether an optical connector is connected to an output port of a remote node and an identification number of the optical connector when the optical connector is connected thereto; controlling an optical switch connected to the optical layer monitoring unit to enable the monitoring light signal to be transmitted through an optical communication link on a basis of the recognized identification number of the optical connector; receiving the monitoring light signal reflected from the optical communication link through the optical layer monitoring unit and analyzing whether the optical communication link is normal; and storing the analyzed information or transmitting the analyzed information through a communication line.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
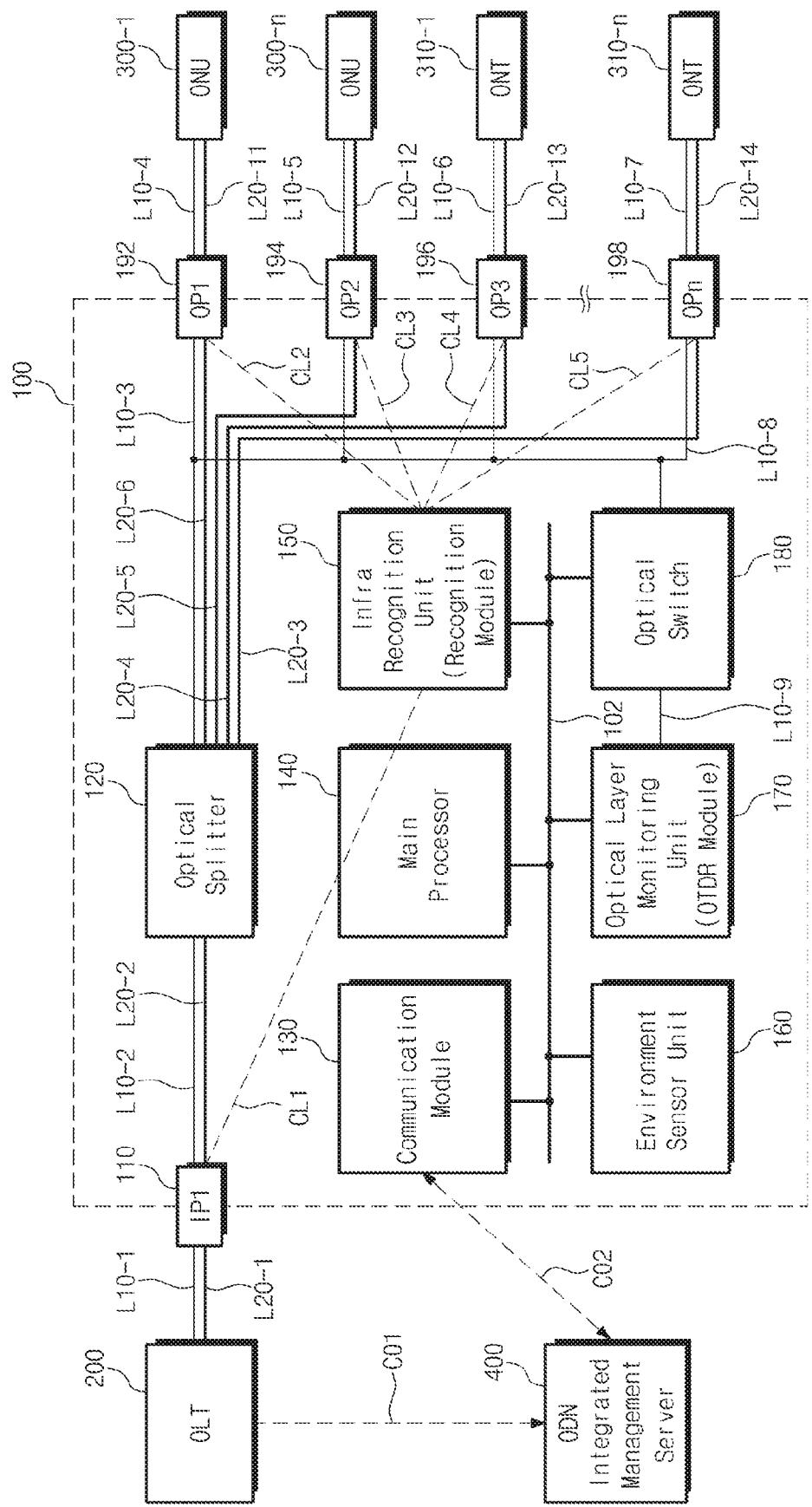
FIG. 1 is a configuration block diagram of a smart remote node (RN) according to an embodiment of the inventive concept.

Hereinafter, embodiments of the present invention will be described in detail with reference to the accompanying drawings so that the present invention can be easily realized by those skilled in the art. The present invention can be practiced in various ways and is not limited to the embodiments described herein.

As known, PON technology is point-to-point optical access network technology. The IEEE and ITU-T are standardizing the PON technology. The PON technology is classified into Ethernet PON (EPON) and Gigabit-capable PON (GPON) technologies and 10G EPON, XG-PON, and TWDM-PON technologies according to data transmission speeds.

With the development of the PON technology, an optical network environment is expected to evolve in a direction of supporting long-reach connectivity (e.g. 60 Km or longer) and high-split ratios (e.g. 128 splits or greater). In the PON technology for such a long-reach and high-split environment, requirements for effectively managing each node in an optical distribution network (ODN) are increasing. In other words, when a fault occurs in a PON link, a service capable of detecting a position of the fault in real time is required. Necessity is also increased which effectively collects and manages connection states and connection information (i.e. information on which port is connected to which optical cable) for various nodes.

For example, in the PON, new optical fibers may be installed and new nodes (i.e. splitters, or optical distribution points) may be installed for new subscribers. As the subscribers increase, installations of optical fibers may be further increased and optical fibers managed with paper labels may be complicatedly installed inside a main body of an apparatus in which nodes are actually installed. In this case, information on which optical fiber is connected to which is frequently managed with memory of or a note of a field engineer. In such a management environment, according to a report for real states of an optical access network, about 30% of resources among the entire ODN infra are reported to be unnecessarily wasted.

In addition, according to a plurality of reports, an equipment operating cost occupies about 36% of a PON operation-related cost, while a cost for installation and management of the ODN occupies about 64%. This may be an important cause for an increase in requirement for effectively managing optical fibers and resources, which are unnecessarily wasted, and for managing the ODN with more effective method than paper labels.

One of reasons why such resource waste and management inefficiency are raised is because the PON nodes are configured with only passive elements. In the early stage of an optical access network service, prices of nodes configured with passive elements are cheap and an operation cost thereof is low. However it may matter at this point when subscribers are growing. In the end, due to passivity, it is impossible to obtain certain information from or control the passive nodes.

In order to monitor the physical layer, an optical time domain reflectometry (OTDR) may be installed in an optical line terminal (OLT), but since it is difficult to effectively perform optical monitoring, a function is required for monitoring the physical layer in real time, effectively obtaining information on resources coupled to the nodes, and managing the resources.

FIG. 1 is a configuration block diagram of a smart remote node (RN) according to an embodiment of the inventive concept.

Referring to FIG. 1, a smart remote node optical network unit (hereinafter referred to "smart RN") 100 may be connected to an OLT 200 through an input port (IP1) 110. The OLT 200 may be connected to an optical distribution network (ODN) integrated management server 400. The smart RN 100 may be connected to ONUs 300-1 and 300-*n* or to indoor optical network terminals (ONTs) 310-1 and 310-*n* through output ports 192, 194, 196, and 198.

The smart RN 100 may include an optical splitter 120, a communication module 130, a main processor 140, an infra recognition unit 150, an environment sensor unit 160, an optical layer monitoring unit 170, and an optical switch 180.

The main processor 140 may control an overall operation of the smart RN according to a preset program.

The optical layer monitoring unit 170 may perform, for monitoring the optical layers, a function as an OTDR module for transmitting a monitoring light signal, for example, an OTDR signal, to the optical switch 180 and receiving the OTDR signal from the optical switch 180.

The OTDR signal transmitted through the optical switch 180 may be output through each of the output ports 192, 194, 197, and 198.

An RFID antenna may be installed at each of the output ports 192, 194, 196, and 198 of the smart RN. The RFID antenna has a several tens of centimeter size and is used for recognizing an RFID tag. The RFID tag is provided in a connector of an optical cable and when the optical cable connector is connected to the output ports, information stored in the RFID tag is output through the RFID antenna. In order to minimize interferences between the output ports, an RFID tag and an RFID antenna operating in a frequency region of 13.54 MHz, in which the recognition distance is relatively short, may be used. In addition, it is also necessary to maintain a distance between the output ports to be about several centimeters in consideration of the recognition distance.

The infra recognition unit 150 performs an optical infra recognition function. The infra recognition unit 150 controls an operation of the RFID antenna. The infra recognition unit 150 obtains identification numbers, namely, IDs of the optical connectors connected to the output ports 192, 194, 196, and 198 through the RFID antenna. In addition, the infra recognition unit 150 obtains connector connection information indicating whether the optical connectors are connected to the output ports 192, 194, 196, and 198 through the RFID antenna.

Although it is described that the IDs of the optical connectors or the connector connection information are obtained through the RFID antenna, the embodiments of the inventive concept is not limited thereto and the recognition may also be performed through short range communication such as near-field communication (NFC). For example, when an NFC antenna is installed in the output ports of the RN in order to recognize an NFC tag installed in the optical connector, the infra recognizing unit 10 may receive the IDs of the optical connectors through the NFC antenna.

The environment sensor unit 160 may include sensors for collecting environment information values (e.g. temperature, humidity, location, movement, illuminance, etc.) of the smart RN. The environment information values may be used for monitoring a surrounding environment and also be used for better composite management measures at the time of occurrence of a specific fault. In other words, when an analysis is performed together with the environment information values at the time of occurrence of the specific fault, the management measures may become more useful. The sensors of the environment sensor unit 160 may be a temperature sensor, a humidity sensor, a movement detection sensor, an illuminance sensor, or a GPS sensor. The environment sensor unit 160 may be adjustably provided with various environment sensors according to a place and location at which the smart RN is installed.

In FIG. 1, the smart RN is illustrated to include an optical splitter 120, which is a passive node, but an optical distribution point (ODP) may be included instead of the optical splitter 120.

The optical layer monitoring unit 170 is connected to the optical switch 180 in order to transmit an OTDR signal to the plurality of ONUs 300-1 and 300-n or the plurality of ONTs 310-1 and 310-n, and to receive a reflective OTDR signal from the plurality of ONUs 300-1 and 300-n or the plurality of ONTs 310-1 and 310-n.

The OTDR signal, which is a monitoring light signal, may be individually analyzed. In other words, the optical switch 180 configures an optical communication link for enabling one of the plurality of ONUs 300-1 and 300-n or one of the plurality of ONTs 310-1 and 310-n to be connected to the optical layer monitoring unit 170. Therefore, at any one time, one optical communication link may be independently configured such that the optical layer monitoring unit 170 may perform optical monitoring on a selected ONU or selected ONT.

In detail, at the time of performing optical monitoring, the reflective OTDR signal may be analyzed by a monitoring light analysis algorithm of a smart RN application to calculate a distance between a point, at which the OTDR signal is reflected, and the smart RN 100. In addition, the intensity or a peak value of the reflective OTDR signal may be calculated. Furthermore, although not being realized by the smart RN application, the optical monitoring may also be realized by an inner algorithm of the optical layer monitoring unit 170, which functions as an ODTR module.

When the OTDR signal, which has a set wavelength transmitted from the smart RN 100 through the optical switch 180, is reflected from another smart RN as a lower layer node, an ONU as a lower layer node, or an ONT as a lower layer node, to be returned to the optical layer monitoring unit 170 as the reflective OTDR signal, a distance value between the smart RN 100 and the lower layer node is calculated. This calculated distance value becomes a reference data for the optical communication link at a corresponding output port. Then, when a periodic monitoring light analysis result is different from the reference data, it is determined that abnormality occurs in the corresponding optical communication link and event data may be generated.

In addition, optical connector IDs obtained first by the infra recognition unit 150 or connector connection information, which indicate whether the optical connectors are connected to the output ports, may also become the reference data for event detection of the infra recognition unit 150. Then, when the IDs or the connector connection information is changed after polling, a change event or a connection event of the optical connector may be generated.

Switching of the optical switch 180 may be controlled by a main processor 140. The main processor 140 may control the switching operation of the optical switch 180 with reference to the connector connection information obtained by the infra recognition unit 150. For example, when the optical connectors are connected to a first output port 192 and a third output port 196, the main processor 140 controls the optical switch 180 to enable the OTDR signal, which is the monitoring light signal, to be transmitted to the ONU 300-1 through the first output port 192 and to enable the reflective OTDR signal to be applied to the optical layer monitoring unit 170. Then, the main processor 140 controls the optical switch 180 to enable the OTDR signal, which is a monitoring light signal, to be transmitted to the ONT 310-1 through the third output port 196 and to enable the reflective OTDR signal to be applied to the optical layer monitoring unit 170.

Lines through which the OTDR signal is transmitted and received are indicated as L10-$i$, where i is a natural number of 1 or greater, on a line path of FIG. 1. The wavelength of the OTDR signal may be set to at least 1625 nm or longer in order to minimize an influence on a signal wavelength of the data.

The main processor 140 may issue a command for periodic polling to the infra recognition unit 150. The infra recognition unit 150 recognizes identification numbers, namely IDs, of the optical connectors, which are stored in the RFID tag through the RFID antenna. In addition, the infra recognition unit 150 obtains connector connection information indicating whether the optical connectors are connected through the RFID antenna. The optical connector IDs or connector connection information may be transmitted to the main processor 140. The main processor 140 may store the IDs or connection information in an internal memory according to a preset program, or may perform a process or control on the basis of the IDs or connection information.

Data managed by the smart RN may be largely divided into three types. First is resource data related to an operation of and basic information on the smart RN. The resource data may include information on setting values (e.g. IP address, communication method, polling period of a server, etc.) for communication and further include other information necessary for operation of the smart RN. In addition, basic information (installation location, place, installation time, manager ID, and specification, etc.) on the smart RN may also be included. The resource data may be stored in a nonvolatile memory in the smart RN or as a file, or may also be changed through a proper process by a change request from the ODN integrated management server 400. For example, the manager ID or the polling period may be changed by the ODN integrated management server 400.

Second type data may be, as actual measurement data, monitored and recognized information, and various environment information values. Since one smart RN may include an input port and an output port, the information and values may include an ID value of an optical connector connected to each port, an OTDR signal value measured for each port, and data collected from various environment sensors, which may exist in a device. Periodically obtained data or data collected by the ODN integrated management server 400 may be stored in an internal memory of the smart RN 100 or transmitted to the ODN integrated management server 400 according to a data transmission policy. Here, the data transmission policy may include a method for transmitting all data, a method for transmitting a specific event, a periodic transmission method, or a method for transmitting summarized data. Such a data transmission policy may be properly adopted according to a setting environment.

Third type data may be event data generated in the smart RN. When the ODTR signal, which is a monitoring light signal, is measured and the measured value is compared with a previous value or a reference value, an event based on abrupt cutting or bending of an optical cable is detected. When such an event is detected, data according thereto is obtained. Even when an event that an optical connector, which has been normally connected to, is separated from an output port, occurs or an event that an optical connector is connected to a vacant output port occurs, the third type data may be generated. In addition, environment event data, which is generated by an abrupt environmental change, may also be included in the third type data. For example, when an event occurs that a luminance value measured in a closed state of a device abruptly increases, data indicating that the device is opened by an unauthorized person or other causes may be generated.

There may be various types of data between the communication module 130 and the ODN integrated management server 400. In addition, the OLT 200 may transmit various types of data to the ODN integrated management server 400. A communication channel between the communication module 130 and the ODN integrated management server 400 may be realized in a wired or wireless manner. The communication channel is equal to be an external communication channel, not to be the optical network. When the data is transmitted through wireless communication, the communication module 130 may be provided with a 3G, LTE, or WiFi modem. In addition, when the data is transmitted through wired communication such as Ethernet, the communication module 130 may be provided with an Ethernet modem.

Furthermore, optical layer monitoring may be performed through interaction with the OLT 200. The OLT 200 may be connected to the ONT 310-1 or the ONU 300-1 through the smart RN 100 and may monitor various controls and a current optical communication state by using a set protocol, for example, an ONT management and control interface (OMCI). In the end, in the ODN, when an optical cable is connected between the OLT 200 and the ONT 310-1 or the ONU 300-1, the optical communication is performed.

When the OLT 200, which is connected through the input port 110, receives a loss-of-signal (LOS) signal from the ONT 310-1, the OLT 200 may recognize that the optical communication enters a communication disabled state. The OLT 200 detects the LOS signal and transmits this event to the ODN integrated management server 400 through a communication line CO1. A method may also be considered that provides a control command for monitoring an optical layer to smart RNs connected to a lower layer of the OLT 200. In the configuration of FIG. 1, the communication line between the OLT 200 and the ODN integrated management server 400 may be used as a channel for providing the control command.

Like this, when the optical layer monitoring unit 170 is installed in the smart RN 100, the pulse overlap problem of the ONU, which exists at the same location, may be solved and a loss of a monitoring light signal in the optical splitter may be prevented or minimized.

In addition, for the smart RN of FIG. 1, a function for collecting various types of data to monitor an optical layer link in real time and to effectively manage resources of the ODN is provided. Accordingly, for an ODN management method, optical layer monitoring, and infra recognition and management may be simultaneously performed in one smart remote node.

Figure 2:
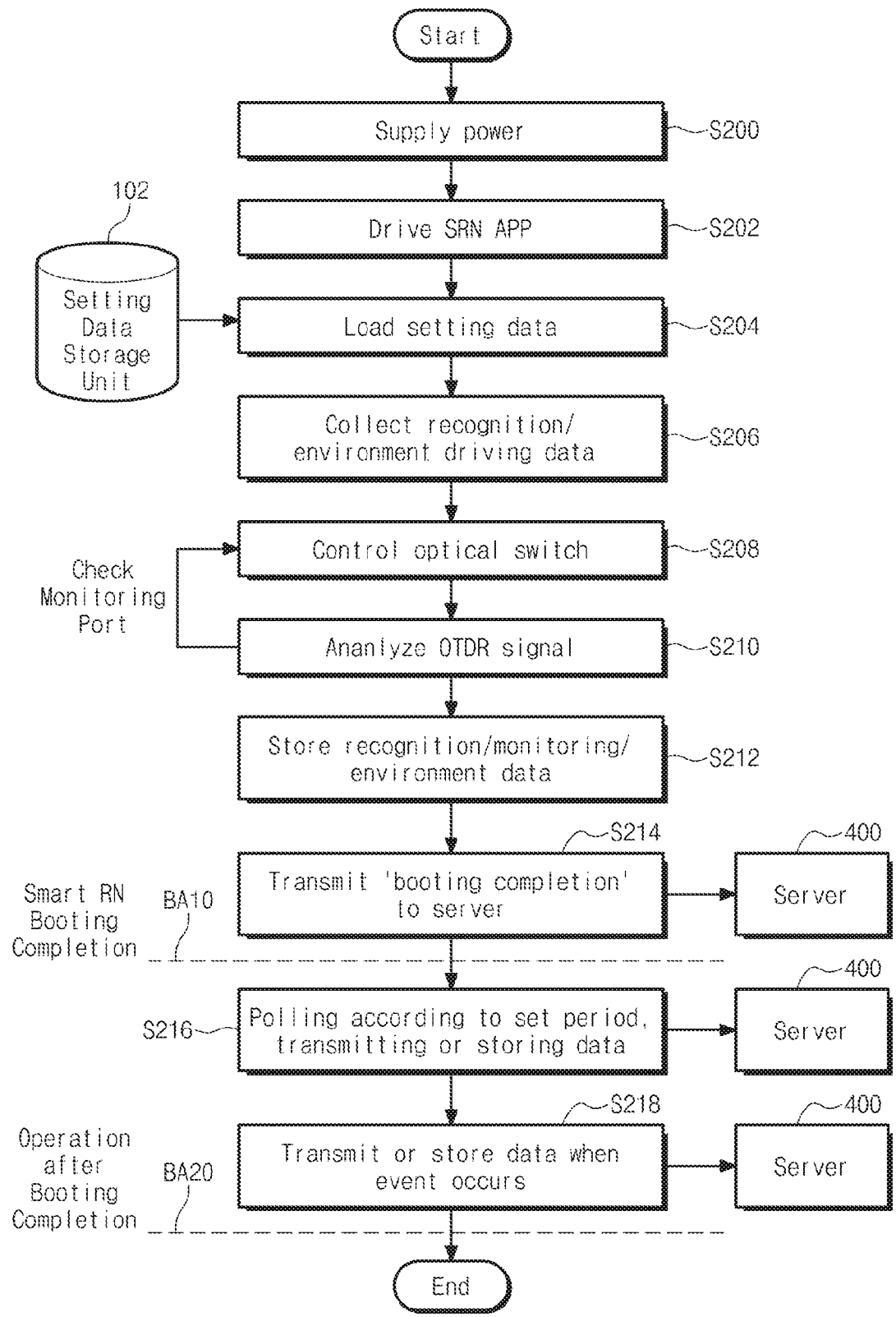
FIG. 2 is a flowchart of an operation control of the smart RN according to FIG. 1.

FIG. 2 is a flowchart of an operation control of the smart RN according to FIG. 1.

Referring to FIG. 2, in operation S200, when power is supplied to the smart RN, a smart RN application is driven in operation S202. The smart RN application may exist as software or firmware and may be executed by the main processor 140 of FIG. 1.

The driving of the smart RN application may be performed by a rebooting command received from the ODN integrated management server 400 or performed even when a device is terminated by a normal or abnormal cause.

The main processor 140 loads the setting data pre-stored in the internal memory according to the smart RN application (hereinafter referred to SRN APP), which is operation software of the smart RN in operation S204. The main processor 140 sets the SRN APP on the basis of the loaded setting data.

The main processor 140 receives identification numbers, namely, IDs of the optical connectors and the connector connection information from the infra recognition unit 150 in operation S206. In addition, the environment information values are received from the environment sensor unit 160. The received information is collected and stored in a memory.

The main processor 140 controls an optical switching operation of the optical switch 180 with reference to the connector connection information in operation S208. For example, when the optical connectors are connected to a first output port 192, the main processor 140 controls the optical switch 180 to enable the OTDR signal, which is the monitoring light signal, to be transmitted to the ONU 300-1 through the first output port 192 and the reflective OTDR signal to be provided to the optical layer monitoring unit 170. Then controls for the optical switching operation may be sequentially performed on other output ports.

The optical layer monitoring unit 170 may generate an electrical signal corresponding to reception intensity of the reflective OTDR signal through a photoelectric converting unit configured with a photo diode array. The electric signal is converted into digital data and then the digital data is analyzed by the main processor 140. In other words, the main processor 140 analyzes the reflective OTDR signal for real time monitoring and recognition in operation S210.

The main processor 140 stores the collected data, the analyzed data, and data used for monitoring and recognition in an internal memory in operation S212. Here, the internal memory may be a nonvolatile semiconductor memory, for example, a flash memory.

The main processor 140 may complete a booting operation in operation S214 and transmit the stored data to the ODN integrated management server 400 through the communication module 130.

In FIG. 2, a line BA10 indicated with a dashed line means a bar line indicating a completion time of booting of the smart RN.

When the booting completion operation is terminated, the main processor 140 performs operation S216. In operation S216, polling is performed according to a set period and data transmission or data storage is performed. The main processor 140 may transmit the obtained data or the stored data to the ODN integrated management server 400 through the communication module 130.

In addition, the main processor 140 performs operation S218 to transmit or store event-generated data when an event occurs according to a result of the periodic polling.

In FIG. 2, a line BA10 indicated with a dashed line means a bar line indicating an operation start time after booting completion of the smart RN.

Figure 3:
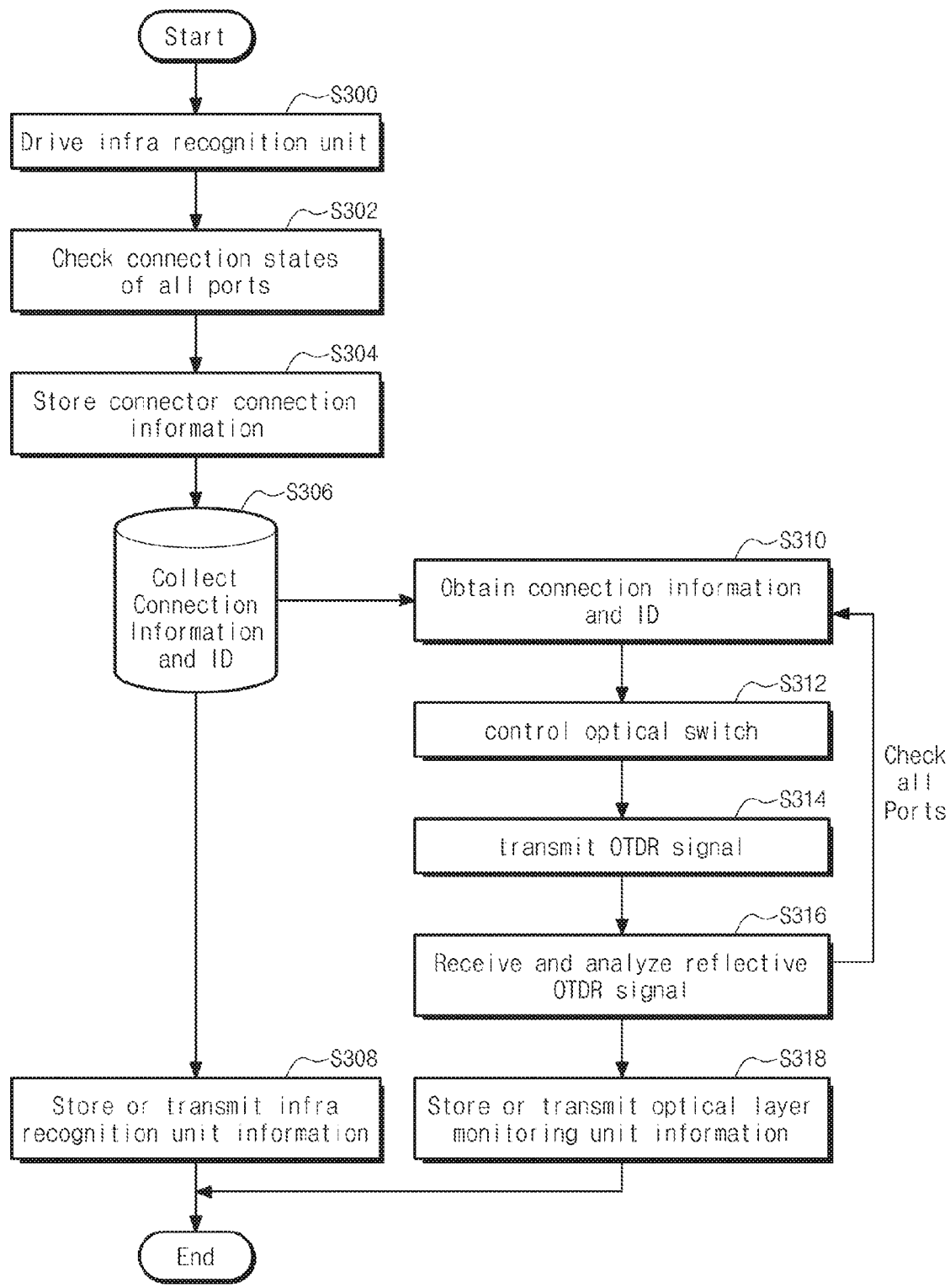
FIG. 3 is a flowchart of an operation control related to the infra recognition unit and optical layer monitoring unit according to FIG. 1.

FIG. 3 is a flowchart of an operation control related to the infra recognition unit and optical layer monitoring unit according to FIG. 1.

Referring to FIG. 3, the main processor 140 performs operation S300 to drive the infra recognition unit, and in operation S302, checks connection states of all output ports through the infra recognition unit 150. In operation S304, the main processor 140 stores, in the internal memory, the connector connection information for the output ports and the IDs of the optical connectors connected to the output ports. Accordingly, as shown in operation S306, the connector connection information and the IDs of the optical connectors may be collected and stored in the internal memory.

Here, the collected connector connection information and the IDs of the optical connectors may be internally stored or transmitted to the ODN integrated management server 400 through the communication module 130 in operation S308.

The main processor 140 obtains the connector connection information and the IDs of the optical connectors in operation S310 and then controls a switching operation of the optical switch 180 in operation S312. The main processor 140 controls the optical layer monitoring unit 170 in operation S314 to enable the OTDR signal, which is a monitoring light signal, to be transmitted and when the reflective ODTR signal is output as an electrical signal through the optical layer monitoring unit 170, the main processor analyzes the output electrical signal in operation S316.

In operation S318, the data analyzed by the optical layer monitoring unit 170 is internally stored or transmitted to the ODN integrated management server 400 through the communication module 130.

The control flow of FIG. 3 may be performed by a command from the ODN integrated management server 400 or be executed at the time of driving the optical layer monitoring unit 170. In addition, when an automatic monitoring driving event occurs according to the polling period, the control flow of FIG. 3 may be executed.

Furthermore, the infra recognition unit 150 may be independently driven without being limited to the control flow in FIG. 3. In addition, the optical layer monitoring unit 170 may be interacted with the infra recognition unit 150 as the control flow of FIG. 3.

The smart RN 100 may perform communication with the ODN integrated management server 400 for various operation policies. When the booting of the smart RN is completed, the ODN integrated management server 400 may receive a message including a booting completion message, which indicates that the booting is completed, through a communication line CO2. The message may include initial setting values of the smart RN 100 as well as data including the connector connection information and the IDs of the optical connectors. The ODN integrated management server 400 may store the data in a database and manage them. The stored data may be used as various reference data for geographic information system (GIS) representation, a topology configuration, or ODN modeling.

The smart RN 100 may change an execution operation by a setting value control signal provided from the ODN integrated management server 400. For example, the polling period of the smart RN 100 may be controlled. The smart RN 100 installed in a region where the number of subscribers are relatively small may have a longer polling period than a smart RN installed in a region where the number of subscribers are relatively large. In this case, the communication cost or power consumption cost may be reduced or minimized.

In addition, the ODN integrated management server 400 transmits a command for an operation control of the infra recognition unit 150 in the smart RN 100, an operation control of the optical layer monitoring unit 170, an operation control of the environment sensor unit 160, and accordingly may receive operation results. In addition, the ODN integrated management server 400 may receive data collected by the polling from the smart RN 100, and store and manage the data in the database.

Through communication between the smart RN 100 and the ODN integrated management server 400, when there is a wrongly connected optical connector, a field engineer may receive notification information from the ODN integrated management server 400. A notification method may be visually realized by changing a color of an LED installed at each output port of the smart RN or acoustically realized by outputting a beep sound through a speaker.

Figure 4:
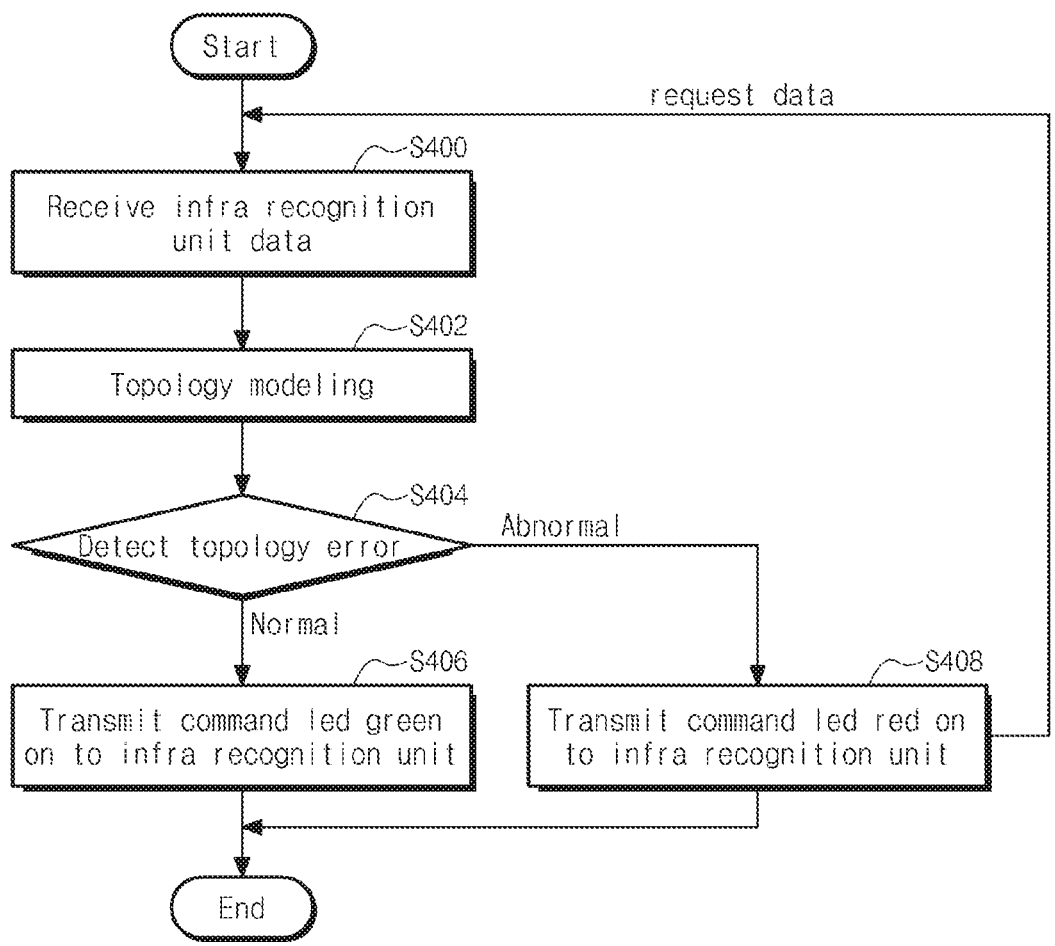
FIG. 4 is a flowchart of the visual notification control according to FIG. 1.

FIG. 4 is a flowchart of the visual notification control according to FIG. 1.

Referring to FIG. 4, the ODN integrated management server 400 receives data of the infra recognition unit by a command or polling in operation S400, and then performs topology modeling for the received data in operation S402. In operation S404, a topology error for a communication network is detected, and when it is determined to be normal without the error, the procedure branches to operation S406. Furthermore, when it is determined to be abnormal due to presence of the error, the procedure branches to operation S408.

In operation S408, a control command for lighting an LED of red color may be transmitted to a corresponding output port. On the other hand, in operation S406, a control command for lighting an LED of green color may be transmitted to a corresponding output port.

Besides, when abnormality occurs in the optical communication link, it may be determined as a topology error and a control command for outputting a beep sound may be transmitted.

According to a smart RN of the inventive concept, a function may be provided which may monitor an optical layer link in real time and effectively manage resources of an ODN. Accordingly, for an ODN management method, optical layer monitoring, and infra recognition and management may be performed in one smart RN at the same time.

In addition, a pulse overlapping limitation in an optical network unit (ONU)/optic al network terminal (ONT) existing at the same location may be solved, and a loss in monitoring light signal may be prevented or minimized in an optical splitter.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A smart remote node optical network node comprising:
    an optical layer monitoring unit configured to transmit a monitoring light signal to an optical network unit through an optical switch and receive a monitoring light signal reflected from the optical network unit through the optical switch;
    an infra recognition unit configured to recognize whether an optical connector is connected to an output port of a remote node and an identification number of the optical connector when the optical connector is connected thereto; and
    a control unit connected to the optical layer monitoring unit and the infra recognition unit and configured to control the optical switch according to a recognition output from the infra recognition unit and to control recognition and monitoring operations of the remote node according to a remote node application,
    wherein the monitoring light signal reflected from the optical network unit is provided to an optical line terminal, which communicates with an optical distribution network integrated management server through an optical splitter.

2. The smart remote node optical network node of claim 1, further comprising an environment sensor unit configured to detect surrounding environment information of the smart remote node optical network node to provide the surrounding environment information to the control unit.

3. The smart remote node optical network node of claim 1, further comprising a communication module configured to provide data generated in the recognition and monitoring operation of the remote node to an optical distribution network integrated management server through a communication line.

4. The smart remote node optical network node of claim 1, wherein the monitoring light signal is transmitted to an indoor optical network terminal.

5. The smart remote node optical network node of claim 1, wherein the optical layer monitoring unit is provided with an optical time domain reflectometry (OTDR) module configured to transmit the monitoring light signal and receive a reflective monitoring light signal.

6. A remote node operation method in a smart remote node optical network node, the remote node operation method comprising:
   installing an infra recognition unit and an optical layer monitoring unit in a smart remote node;
   recognizing whether an optical connector is connected to an output port of a remote node and an identification number of the optical connector when the optical connector is connected thereto;
   controlling an optical switch connected to the optical layer monitoring unit to enable a monitoring light signal to be transmitted through an optical communication link on a basis of the recognized identification number of the optical connector;
   receiving the monitoring light signal reflected from the optical communication link through the optical layer monitoring unit and analyzing whether the optical communication link is normal; and
   storing the analyzed information or transmitting the analyzed information through a communication line.

7. The remote node operation method of claim 6, wherein the monitoring light signal has a wavelength of 1625 nm or longer for minimizing an influence on a signal wavelength of data.

8. The remote node operation method of claim 6, wherein at a time of analyzing the monitoring light signal, at least one of temperature, humidity, movement detection, luminance, and GPS information is referred to.

9. The remote node operation method of claim 6, wherein data handled in the remote node operation method is at least one of resource data related to an operation of the smart remote node and basic information, actually measured data, and generated event data.

* * * * *